(12) United States Patent
Ratermann

(10) Patent No.: US 10,817,925 B2
(45) Date of Patent: Oct. 27, 2020

(54) GAS CYLINDER INVENTORY SIGNALING APPARATUS AND METHOD

(71) Applicant: Ratermann Manufacturing, Inc., Livermore, CA (US)

(72) Inventor: George W. Ratermann, Livermore, CA (US)

(73) Assignee: Ratermann Manufacturing, Inc., Livermore, CA (US)

(*) Notice: Subject to any disclaimer, the term of this patent is extended or adjusted under 35 U.S.C. 154(b) by 660 days.

(21) Appl. No.: 15/494,250

(22) Filed: Apr. 21, 2017

(65) Prior Publication Data

US 2017/0221136 A1 Aug. 3, 2017

Related U.S. Application Data

(63) Continuation-in-part of application No. 14/799,230, filed on Jul. 14, 2015, now abandoned, which is a continuation-in-part of application No. 14/509,532, filed on Oct. 8, 2014, now Pat. No. 9,880,320, which is a continuation-in-part of application No. 14/509,570, filed on Oct. 8, 2014, now abandoned.

(51) Int. Cl.
| | |
|---|---|
| *G01D 5/26* | (2006.01) |
| *G01D 5/48* | (2006.01) |
| *G06Q 30/06* | (2012.01) |
| *G06Q 10/08* | (2012.01) |
| *G01D 11/24* | (2006.01) |
| *G01D 3/02* | (2006.01) |

(52) U.S. Cl.
CPC .......... *G06Q 30/0635* (2013.01); *G01D 5/26* (2013.01); *G01D 5/48* (2013.01); *G06Q 10/087* (2013.01); *G01D 3/022* (2013.01); *G01D 11/245* (2013.01)

(58) Field of Classification Search
CPC .......... G06Q 30/06; G06Q 10/08; G01D 5/26; G01D 5/48; G01D 3/022; G01D 11/245
See application file for complete search history.

(56) References Cited

U.S. PATENT DOCUMENTS

| | | | |
|---|---|---|---|
| 4,636,950 A | 1/1987 | Caswell et al. | |
| 4,642,007 A * | 2/1987 | Marshall | B60P 3/055 296/183.1 |
| 4,766,548 A | 8/1988 | Cedrone et al. | |
| (Continued) | | | |

OTHER PUBLICATIONS

W.J. Bell et al., "Improving the distribution of industrial gases with an on-line computerized routing and scheduling optimizer", Air Products & Chemicals, Inc., Dec. 6, 1983, pp. 4-23.

*Primary Examiner* — Gregory J Toatley, Jr.
*Assistant Examiner* — Lynda Dinh
(74) *Attorney, Agent, or Firm* — Thomas Schneck

(57) ABSTRACT

A gas cylinder counting apparatus that has a cage or rack with aligned parallel rows or bins of industrial gas cylinders stored in the cage or cage having upright posts with gas cylinder movement detectors. Gas cylinders in each bin are separated from each other to form an x-y cylinder array. Sensors attached to posts count cylinder removals by changes of state of the cylinder array and report removal of a cylinder from the bin to a local server. When gas cylinders are removed from cages, local servers report to a remote server that may be in a cloud having management software for gas cylinder delivery using orders from each local server.

19 Claims, 4 Drawing Sheets

(56) References Cited

U.S. PATENT DOCUMENTS

| | | | |
|---|---|---|---|
| 4,884,928 A * | 12/1989 | Nachtigall | B60P 7/083 |
| | | | 410/103 |
| 5,505,473 A | 4/1996 | Radcliffe | |
| 5,608,643 A | 3/1997 | Wichter et al. | |
| 6,346,680 B1 | 2/2002 | Takahashi et al. | |
| 6,553,128 B1 * | 4/2003 | Jouvaud | G06Q 10/087 |
| | | | 340/5.2 |
| 6,685,404 B2 * | 2/2004 | Udivich | B60P 3/055 |
| | | | 211/85.18 |
| 6,712,276 B1 | 3/2004 | Abali et al. | |
| 6,761,194 B1 | 7/2004 | Blong | |
| 6,783,311 B2 * | 8/2004 | Sauerwald | B60P 7/0823 |
| | | | 410/116 |
| 7,304,588 B2 | 12/2007 | Ingalsbe et al. | |
| 7,619,523 B2 | 11/2009 | Durtschi et al. | |
| 7,635,854 B1 * | 12/2009 | Babin | G01F 23/2928 |
| | | | 250/573 |
| 8,159,358 B2 | 4/2012 | van Schie et al. | |
| 9,453,611 B2 * | 9/2016 | Suman | F17C 13/028 |
| 2005/0244096 A1 * | 11/2005 | Jeffers | G01B 9/02007 |
| | | | 385/15 |
| 2007/0050271 A1 | 3/2007 | Ufford et al. | |
| 2008/0084306 A1 | 4/2008 | Durtschi et al. | |
| 2010/0241277 A1 | 9/2010 | Humphrey | |
| 2011/0140850 A1 | 6/2011 | Wassel et al. | |
| 2012/0160604 A1 * | 6/2012 | Bowden | B66F 11/046 |
| | | | 182/18 |
| 2012/0242352 A1 * | 9/2012 | Gong | H03K 17/9525 |
| | | | 324/656 |
| 2012/0292399 A1 | 11/2012 | Launiainen | |
| 2012/0299314 A1 | 11/2012 | Jiang | |
| 2013/0049382 A1 | 2/2013 | Day et al. | |
| 2014/0163727 A1 | 6/2014 | Siamer | |

\* cited by examiner

GAS CYLINDER INVENTORY SIGNALING APPARATUS AND METHOD

CROSS-REFERENCE TO RELATED APPLICATION

This application is a continuation-in-part of U.S. patent application Ser. No. 14/799,230 filed Jul. 14, 2015 which is a continuation-in-part of U.S. patent application Ser. No. 14/509,532 filed on Oct. 8, 2014 and a continuation-in-part of U.S. patent application Ser. No. 14/509,570 filed on Oct. 8, 2014, all of which are incorporated by reference herein.

TECHNICAL FIELD

The invention relates to a gas cylinder inventory counting and signaling from gas cylinder storage cages in a gas cylinder ordering and delivery system.

BACKGROUND ART

Industrial concerns, such as hospitals, welding shops, chemical processing plants and similar businesses, use large numbers of cylinders of industrial gases. Cylinders are delivered to such businesses in full condition and picked up after use. The cylinders are heavy, expensive and must be carefully stored. Methods for distribution and inventory control have been a subject of much research for many years. For example, see the paper in Interfaces 13, 6 Dec. 1983, p. 4-23 entitled "Improving the Distribution of Industrial Gases with an On-Line Computerized Routing and Scheduling Optimizer" by W. J. Bell et al. The article describes the efforts of Air Products and Chemicals, Inc. to implement industrial gas cylinder inventory management at customer locations with delivery vehicle scheduling. A sophisticated software algorithm for the project is described. An essential part of the gas cylinder management problem is knowing the present inventory of full and empty tanks. Usually a customer is responsible for inventory status and different customers have different approaches.

An object of the invention is to monitor use of gas cylinders at end user locations and report used cylinders/tanks to a tank management cylinder system.

SUMMARY OF THE INVENTION

These and other objects are achieved by a gas cylinder storage and signaling system detecting gas cylinder absence or presence in storage positions, ideally a grid pattern of a storage bin measured at timed intervals, to determine the bin logic state and communicating the bin logic state as a tank count for placing a tank order to a remote server at each timed interval. The bin logic state is an array of ones and zeros where one indicates presence of a tank and zero the absence of a tank, or vice-versa. The term grid is not intended to limit the storage positions to any particular geometric shape of tank positions, so long as there is a mathematical representation of the grid as an logic array. The storage bin comprises gas cylinder storage positions as an electronic grid, including rows with a gas cylinder sensor for each tank position associated with a logic device continuously generating logic states, one or zero, for the grid at timed intervals corresponding to the inventory of gas cylinders stored in the grid or other array, i.e. the tank count.

In the invention, one of the inputs for gas cylinder management software for industrial gas cylinder ordering and deliverys comes from a tank farm of a user where gas cylinders are stored prior to use in a cage or rack and then counted as cylinders are used. The present invention contemplates a gas cylinder cage or rack that has multiple bins or rows where gas cylinders are stored in an x-y grid pattern of cells, the cage having upright posts and horizontal rails aligning multiple cylinders in rows or called bins, sometimes with a safety closure such as a cable between members of a row that establish a geometric x-y array of cylinders. The upright posts support horizontal rails have gas cylinder detection proximity sensors which report removal of a cylinder to a local server that maintains a count of cylinders in the cage. Optical beam sensors, with a beam spanning a grid cell, are preferred. Because gas cylinders can have different sizes, i.e. diameters, rails of a cage may have multiple beam sensors for gas cylinder detection so that a cylinder that is not in the geometric center of a grid cell is still counted. The sensors are associated with array logic having a first logic state indicating a quiet state associated with a known number of cylinders and a second logic state indicating removal of a cylinder from a bin. Multiple cylinder proximity sensors communicate logic states of a cage or rack at timed intervals, as described above, to with a networked local server for signaling changes of logic states associated with removal of cylinders from different bins of a rack or cage.

Different type of gases can be stored in a bin but in known positions, such as segregated by rows. Each different gas type has a preset inventory threshold for all tanks of the same gas type. When the inventory of tanks for a particular gas type drops below the threshold, all missing tanks are identified for ordering as seen in the new logic state, not merely the ones below the threshold of one particular gas. All gas types are ordered if missing tanks are indicated once a threshold is reached. If missing tanks are indicated, but no threshold level is reached, then no order is placed. Gas cylinder inventory management software communicates with the order.

A plurality of local servers having such orders is connected via the Internet or otherwise to a remote server that is associated with gas cylinder management and supply software and route management software. The remote server tracks orders and cylinder usage from the cylinder tank storage units of different users and optimizes delivery of replacement cylinders. The remote server can display gas cylinder management information via a website or a smart phone app.

BRIEF DESCRIPTION OF THE DRAWINGS

FIG. 1b is a gas cylinder logic state map for the gas cylinder cage of FIG. 1a.

DETAILED DESCRIPTION OF THE INVENTION

Figure 1A:
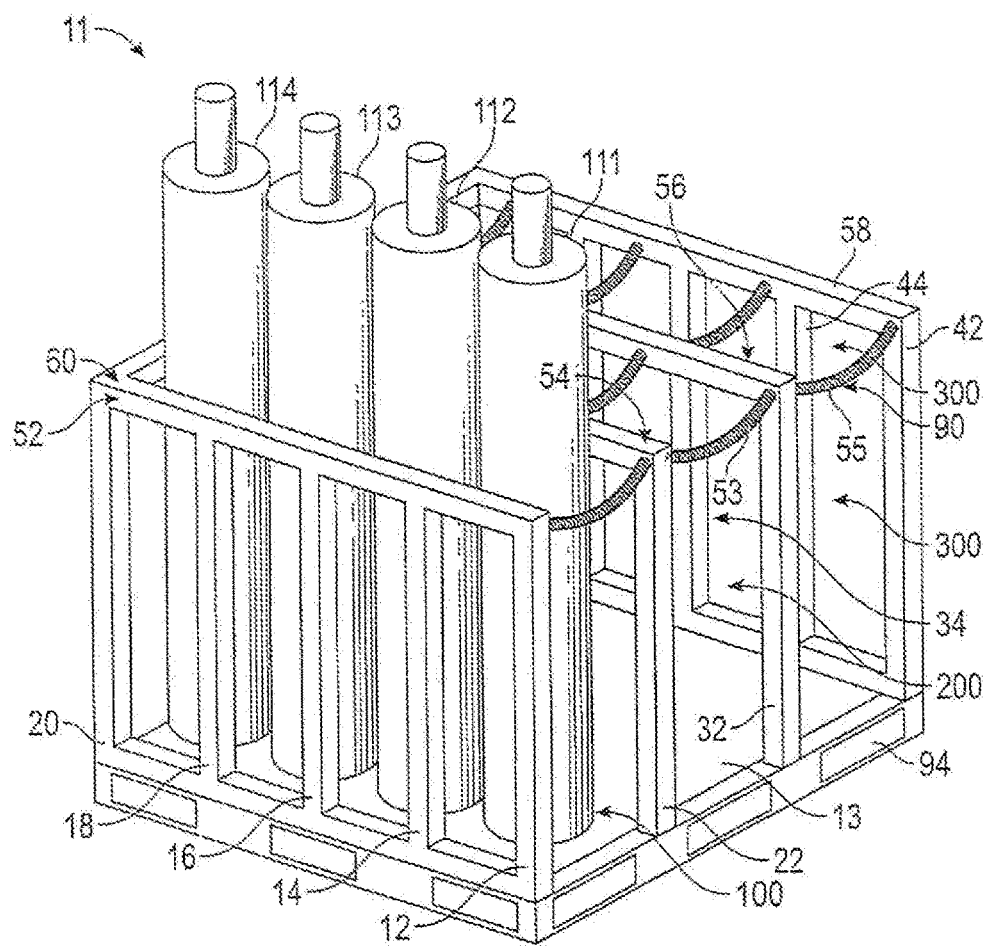
FIG. 1a is a perspective plan view of a gas cylinder cage in accordance with the invention.

With reference to FIG. 1, a gas cylinder cage or rack 11 is shown having a plurality of bins or rows 100, 200, and 300. The gas cylinder cage 11 has a floor 13 and upright posts 12, 14, 16, 18, 20, 22, 32, 34, 42, 44, etc. that support parallel horizontal rails or fences 52, 54, 56, 58, with spaced apart pairs of rails forming each tank storage bin to establish a geometric array of gas cylinders. The rails also form the side walls and back wall 60 of the cage, with the front, opposite to back wall 60, being open for placement and removal of gas cylinders into and out of the cage. FIG. 1 shows three bins 100, 200 and 300. The width of each bin, such as bin 100, exceeds the width of the largest gas cylinder to be stored, such as gas cylinders 111, 112, 113, and 114 by a slight amount, an inch or two on a side, such that a series of cylinders may be aligned in a bin, as shown in bin 100. The width of a bin will accommodate only one gas cylinder but the depth of a bin will accommodate several cylinders. The height of the upright posts is sufficient so that the gas cylinders cannot tip over or be readily lifted over the posts but must be removed from the front of the cage.

Typically each row will have cylinders of a single gas type. For example, a cage or rack could have two rows of oxygen cylinders, one row of helium cylinders and one row of nitrogen cylinders. Sometimes cylinders of different gas types will have slightly different diameters, but the bins or rows are divided so that an x-y array of gas cylinders is present.

Each bin, such as bin 100, has an optional series of cables or dividers, such as gates or small doors, securing tanks in specified spaced apart positions, dividing the row into a number of cells. The cables may be chains, such as chains 90, that may be connected onto the posts 12, 22, and 32 to form gas cylinder enclosures that establish an array of cylinders, such as a rectangular x-y array where each tank is in a grid cell of the array. Other cables may be uniformly spaced in a bin and sets of cables may be connected between posts to secure the cylinders in an upright t position particularly where seismic safety is an issue. Cables are coupled by clasps to posts 22, 32, and 42, and are manually releasable to allow adding and removing of gas cylinders in and out of a bin.

When gas cylinders are placed in the bins, all of the cables are manually released to accommodate entry of the cylinders into the bins. Then, as each cylinder is placed in a bin, toward the back of the bin insofar as possible, the cables are hooked up to the posts manually to allow each gas cylinder to be enclosed in a designated space so that a tank array geometry is established. Cylinder sensors associated with each grid cell sense the presence or absence of a cylinder in a grid cell and transmits the sensed condition as an electrical signal to a x-y state map of stored cylinders. For example, presence of a cylinder may be represented as a logic one and absence of a tank as a logic zero in the x-y state map.

The array geometry becomes an initial logic state at a local server. When all bins are full of gas cylinders, the cage typically has a rectangular x-y array of gas cylinders in rows and columns whether cables are used or not. A maximum number of gas cylinders is optimally placed in a cage since a rectangular floor footprint can accommodate a grid pattern of a certain size cylinder. For example, a floor size can correspond to dimensions for being set on a shipping palette size of 34 inches by 42 inches, or a few inches smaller or larger on each side and so the floor is divided into an x-y grid pattern of cells optimized for cylinder diameter of the largest gas cylinders to be stored in the cage. The cage 11 may have a steel or aluminum floor with square cut outs 94 for a fork lift driver to lift the bin cage 11 onto a palette or transfer the bin cage 11 directly.

Figure 1B:
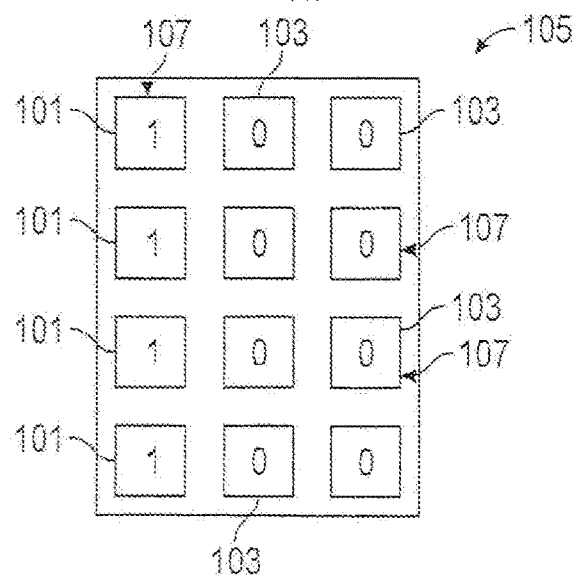

In grid cells 101 of array 105 in FIG. 1b, a logic one is seen indicating the presence of gas cylinders in corresponding positions of the left row 100 of the cylinder cage 19 in FIG. 1a. All other grid cells 103 have logic zeros 107 indicating an absence of gas cylinders in corresponding positions in rows 200 and 300 in FIG. 1a.

Figure 2:
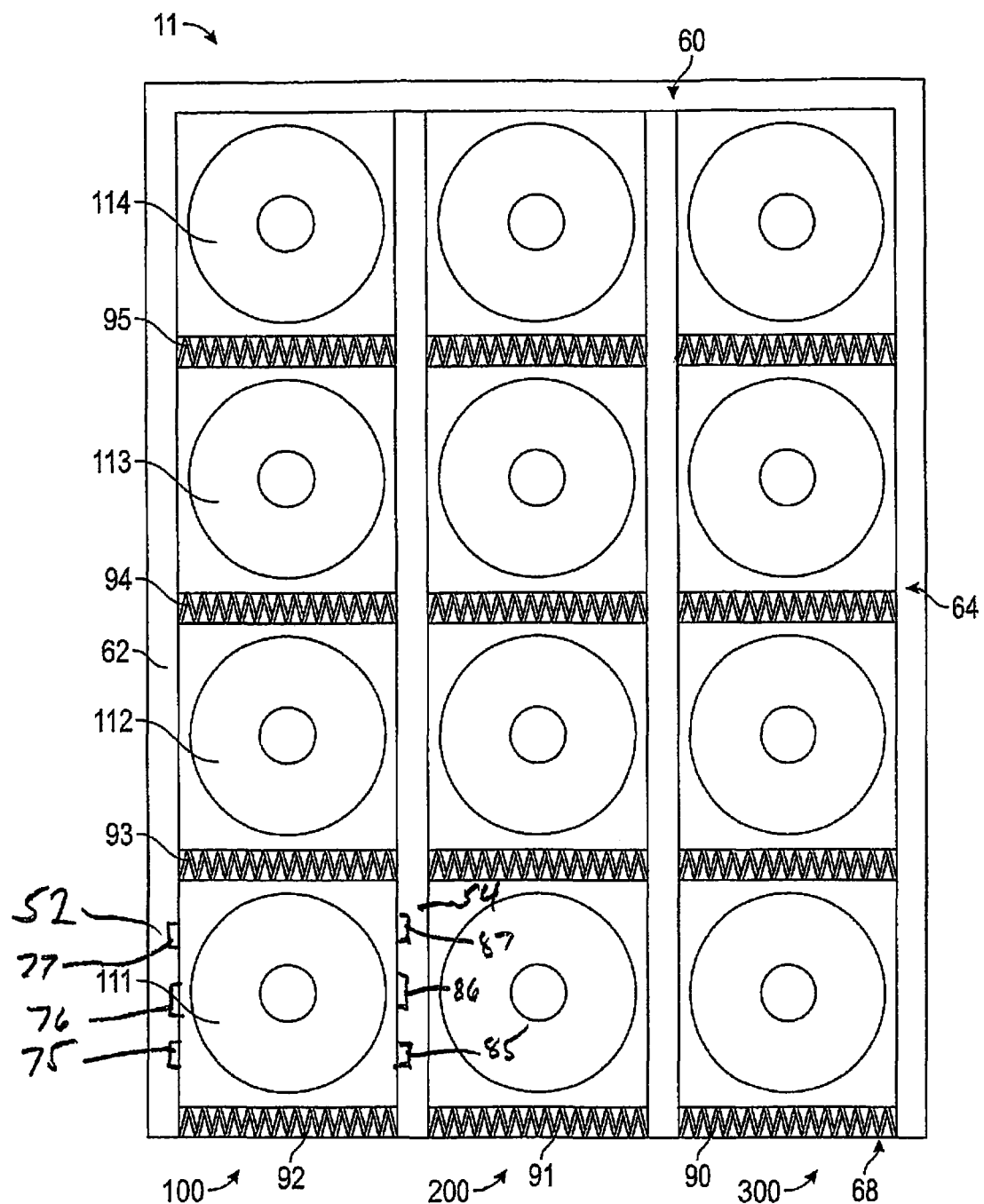
FIG. 2 is a top plan view of a gas cylinder array having three parallel bins with upright industrial gas cylinders.

With reference to FIG. 2, the grid cells of FIG. 1b may be seen to be occupied by gas cylinders of a cage 11. The gas cylinder cage 11 is shown to have opposite side walls 62 and 64, with back wall 60. The front 68 of the tank cage is open when cables 90, 91, and 92 are open, but is closed when the cables are latched to the posts. A first row of gas cylinders 111, 112, 113, and 114 are shown to be aligned in the first bin or row 100 as part of a grid pattern established by closure of respective cables or chains 92, 93, 94, and 95. The closed cable associated with each gas cylinder is at the front of each cylinder with the front direction being associated with the front 68 of the cage 11. As previously mentioned use of cables or chains is optional, although sometimes required for seismic safety reasons, and establishes a geometric x-y cylinder grid pattern for counting purposes. Other cylinder placement mechanisms, such as gates or floor indentations, or even visual sighting, can be used so long as a grid pattern of cylinders is established. Full bins 100, 200, 300 establish a full cage as an initial logic state with 12 cylinders in a logic device. Order thresholds may be set for each gas type. For safety reasons, gas types are not usually mixed in the rows. In other words, each row has a specific type of gas in the cylinders. Rows of the same gas type may be counted together by addition. For example, two rows of four tanks of oxygen would be counted as 8 tanks of oxygen. A threshold of 2 tanks of oxygen may be set as the level for ordering replacements. Threshold levels for each different gas type are established. When the inventory of gas cylinders drops below any threshold level, an order is placed, not only for gas cylinders that have reached the threshold level but for all gas cylinders that have been reported used. This reduces the number of delivery trips that are required.

Logic devices may be computer memory or electrical devices such as gate arrays or registers, all associated with a server that may be a local server or a cloud server. Signaling between the cylinder cages and the logic device may be wireless or wired, and may use the Internet for carrying signal messages between a cage and a server with the associated logic device.

Figure 3A:
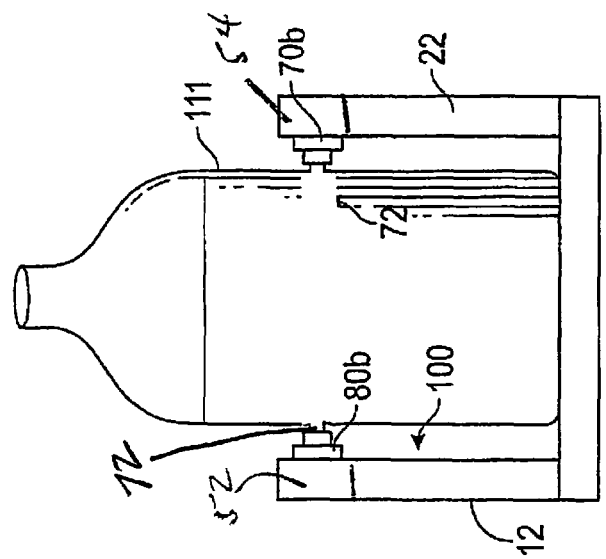
FIGS. 3a-3c are front views of one row of a gas cylinder cage with a gas cylinder.

With reference to FIG. 3a, the open end of a single bin 100 of a tank cage is shown. No cables are used because gas cylinders are situated visually. Bin 100 is shown to have a gas cylinder 111 with a collar 71. In one embodiment, sensors 70 and 80 are electronic chip detectors that require proximity of the chip to the detector, sometimes used in the automotive industry to unlock car doors by proximity of an electronic chip to a chip sensor. On the cylinder 111 the gas cylinder collar 71, or a tag supported from the collar, has a chip 72. When a gas cylinder is removed from the bin, the chip detectors 70 and 80 which are mounted to posts 12 and 22 of the bin cage both detect the removal of the gas cylinder from the cage. The proximity to chip sensors 70 and 80 to chip 72 presents a signal to the chip detectors that does not occur when a cylinder from a neighboring bin is removed. The chip sensors indicate to a server located nearby the cage that a gas cylinder 111 has been removed.

Figure 3B:
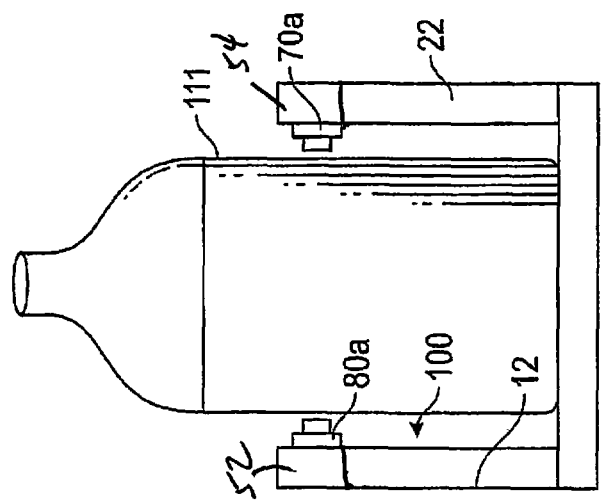

In FIG. 3b showing another embodiment of a gas cylinder sensor, sonic or ultrasonic sensors 70a and 80a may be mounted to posts 12 and 22 of the cage rather than chip detectors. The sonic or ultrasonic sensors direct beams of sonic waves into grid cells in a pulse-echo manner, like sonar. The return of a very strong echo signal indicates presence of a tank near the acoustic wave transmitter. The absence of a strong echo indicates absence of a tank from the grid cell. Pulse-echo signals may be phased in time, if desired, so that only one pulse occurs at any one time, to avoid confusion in echo signals, with pulses spaced several milliseconds apart, sufficient to allow for sound attenuation from a prior pulse. Detectors for each grid cell are time-gated to listen for a sonic pulse only at the time when the grid cell is queried with a sonic pulse in a manner such that only a detector associated with a pulsating sonic source has incoming sound wave processing at one time. When a gas cylinder 111 is removed from the cage, sonic or ultrasonic waves detect the absence of proximity to gas cylinder 111 to the sonic detector and an electrical signal, interpreted as a logic indicator of part of a tank count that sends a signal to a server to indicate that the gas cylinder 111 has been removed. A collection of signals from all grid cells over an interval allowing for pulsing of all grid cells forms a logic array for the cage.

Figure 3C:
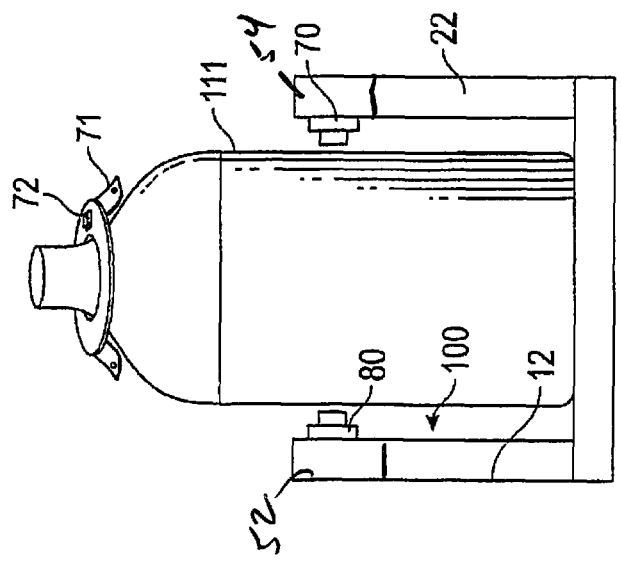

In a preferred embodiment of a tank count sensor, shown in FIG. 3c, several optical light beams 72 may be established in rails atop bin cage posts 12 and 22. An exemplary grid cell is shown in the lower left of FIG. 2. Rail 52, supported atop upright posts has a number of light beam sources 75, 76 and 77. Source 76 is in the center of the grid cell, while sources 76 and 77 are slightly offset from the center. The use of 3 sources allows tanks of different sizes to block at least 2 of the 3 beams. Blocking of at least two beams at corresponding detectors 85, 86 87 located in rail 54, i.e. transmission of light seen at one detector, indicates presence of a gas cylinder while transmission of light as seen by 3 detectors indicates absence of a cylinder. Transmission of light seen at 2 detectors should not occur and indicates a fault condition. Signals from the optical light beam detectors 85, 86 and 87, as well as corresponding signals from other grid cells are sent to the server to indicate presence or absence of gas cylinders. Each grid cell has similar beam transmitters and detectors within the rails that define opposed side walls of the grid cell to monitor presence or absence of a gas cylinder in the x-y grid array, with the logic state of the array transmitted to the server to indicate gas cylinder inventory in the storage array.

Figure 4:
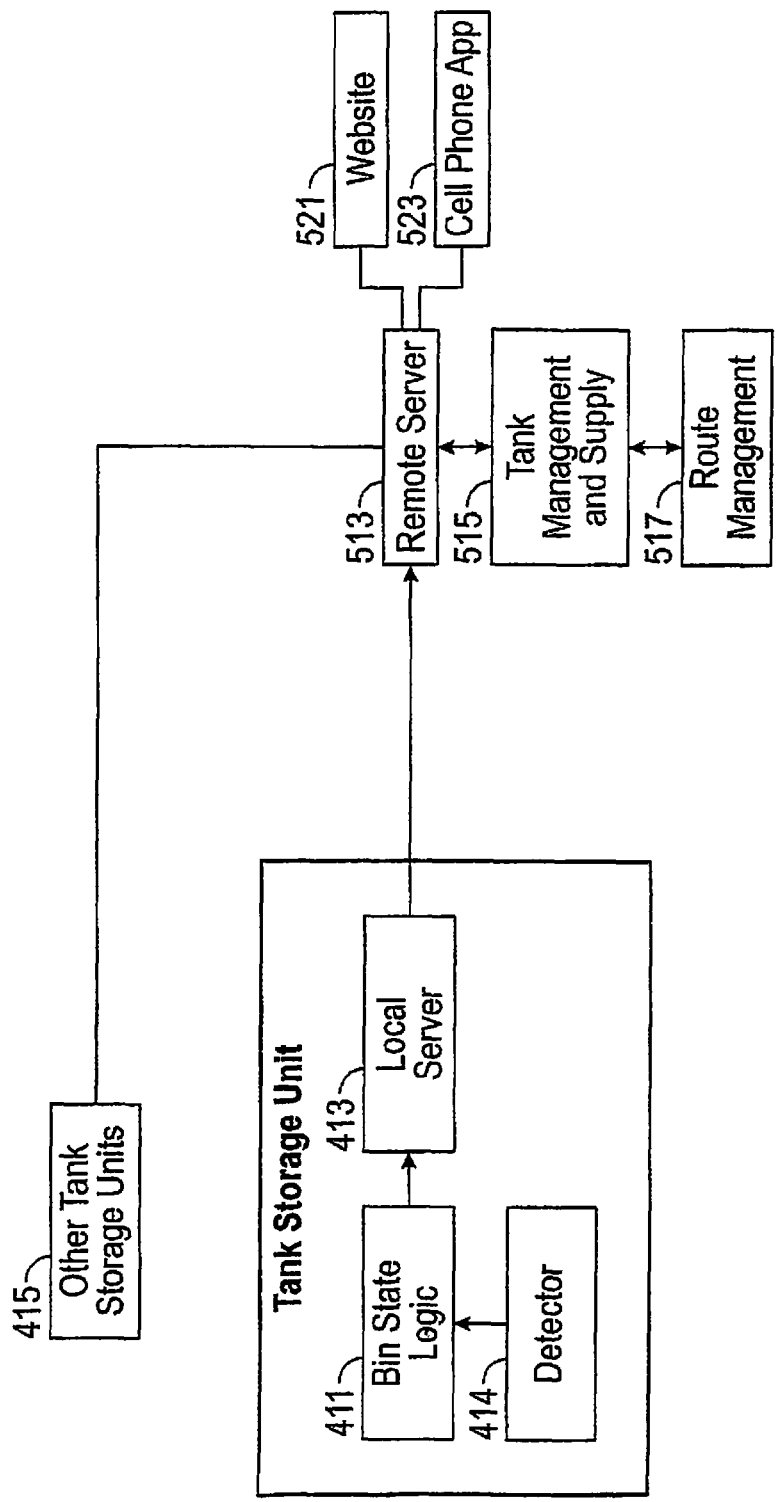
FIG. 4 is an electrical plan of a gas cylinder inventory signaling system in accordance with the invention.

A user sets the initial threshold of gas cylinders for ordering gases stored in bins of a tank cage. The user al-so sets the maximum desired inventory, i.e. an initial cage state representing desired count of tanks for specific gases stored in bins of the cage. The threshold and maximum levels are established in state logic 411, seen in FIG. 4. Logic 411 consists of computer memory or in memory within FPGA's that monitor changes or decrements from the initial state of the cylinder array to the next state, and so on. When a cylinder is removed, detector 414 signals a state change to logic 411 as a count monitored in local server 413. In other words the geometric pattern of cylinders in the cage form a logic state of the cage monitored periodically, for example, every 10 to 20 seconds. Each change of state is monitored and compared with thresholds established for various gases. When the number of gas cylinders of a specific gas reaches a preset threshold level, an order signal is generated and sent to remote server 513. However, the order signal is modified to include gas cylinders that are missing from the maximum desired inventory, even gas cylinders that are have not reached the threshold level. This reduces the number of deliveries due to the reaching of thresholds for different gases at closely spaced times.

Reporting of detected signals in FIG. 3c to a local server may be by a local wire network or a wireless network, or a hybrid network that is partly wire and partly wireless. The local server 413 reports the array logic state to a remote server 513 via the Internet or a private line. The remote server 513 tracks similar information from other tank storage units 415. The local server 413, as well as the remote server 513, may be part of a cloud server.

Remote server 513 has a count of cylinders removed from bins based upon the bin array sensor states from all connected cylinder storage units reporting through local servers, as well as order information that is based upon reaching preset thresholds. The count may be a database associated with different types of industrial gases where each bin is associated with a specific gas. The database monitors each specific gas, watching threshold levels and orders from local servers Such a database is used by known tank management and supply software 515 that handles supplier ordering, purchasing, stocking, and location of replacement cylinders. The tank management supply module 515 is connected to a route management module 517 that optimizes delivery of replacement cylinders. Both tank and cylinder management and supply software and route management software are well known and have been described in many publications.

The remote server 513, as well as local server 413, have a video display output that can be an internet website 521 or a cell phone app 523 so that server information relevant to a user can be graphically shown to users. For example, a user can confirm receipt of an order and the status of resupply from the tank management supply module. Cylinder management supply software 515 and route management software 517 also communicate with the remote server for display of information through the website and the cell phone app.

In operation, if there has been no change in an initial user-established logic state transmitted from a gas cylinder storage cage, no replacement cylinders or tanks are needed for that location and such information can be dis-played on a website or a cell phone app. On the other hand, if cylinder detectors show that a number of gas cylinders have been removed from bins of a tank cage such that a preset threshold number of cylinders for a specific gas is reached, an order signal is generated for all gas cylinders that are below the user-established desired level. This order information is conveyed by a local server to a remote server and then to the website or cell phone app. Replacement gas cylinder procurement and delivery is confirmed to the website or cell phone app, while being handled by the cylinder or tank management and supply software 515 with the specifics of delivery handled by the route management software 517. All of this is made possible by the cylinder cage gas cylinder counting system of the present invention.

What is claimed is:

1. A gas cylinder counting and ordering system comprising:
    a cage storing a plurality of gas cylinders in parallel rows that form bins having defined storage locations for the gas cylinders therein geometrically forming a grid of x-y cells, each grid cell of the cage having dimensions accommodating only one gas cylinder and each bin holding multiple cylinders of one particular gas;
    a gas cylinder proximity sensor associated with each of said grid cells and a logic device having a state map of gas cylinders in cells of the cage at a particular time, the state map indicating the presence or absence of a gas cylinder in each grid cell using the proximity sensors associated with corresponding grid cells;
    wherein the logic device has a user defined threshold for a count of selected gas cylinders in the cage;
    means for storing in the logic device an electrical signal representing a desired number of gas cylinders of each gas type to be placed in the cage and for storing an electrical signal representing the threshold number of gas cylinders of each gas type that is less than the desired number for ordering replacement cylinders upon reaching the threshold number;

means for periodically sensing the presence or absence of gas cylinders in the storage cells using cylinder proximity detectors and generating a count signal for gas cylinders of each gas type;

means associated with the logic device for generating an order signal when a could signal for gas cylinders of a gas type reaches the threshold number, the order signal representing a number gas cylinders of the particular gas type between the desired number of gas cylinders and the threshold number; and a remote server in communication with the logic device that receives the electronic order from the logic device, the remote server having supply and delivery software for order fulfillment.

2. The apparatus of claim 1 wherein the grid cells of the cage are defined by fixed horizontal parallel rails in one direction and removable cables spanning a distance between rails in an orthogonal direction.

3. The apparatus of claim 2 wherein the removable cables are chains.

4. The apparatus of claim 2 wherein said cables are fixed to the cage on one side of a cell and have a clasp latching to an opposed side of the cell.

5. The apparatus of claim 2 wherein the cage has a floor approximating dimensions of a shipping pallet supporting the plurality of gas cylinders in upright positions.

6. The apparatus of claim 5 wherein the cage has gas cylinders of diverse heights and the cage floor supports upright posts having a height that is between ⅓ to ⅔ the height of the gas cylinder with greatest height stored in the cage, the upright posts supporting horizontal parallel rails.

7. The apparatus of claim 6 wherein the floor has parallel channels below the floor spaced apart a distance to receive fork lift tangs for lifting the cage.

8. The apparatus of claim 1 wherein the gas cylinder sensors are optical beam sensors with beams spanning a distance between rails.

9. The apparatus of claim 8 where a plurality of spaced apart optical beam sensors span a distance between rails of the grid cells.

10. The apparatus of claim 1 wherein the logic device stores a user specified desired number of gas cylinders in a bin.

11. The apparatus of claim 10 wherein the electronic order comprises the desired number of tanks less the threshold number for a particular gas plus tanks of all other particular gases that are absent from the desired number in the cage.

12. The apparatus of claim 1 wherein the remote server is a cloud server.

13. The apparatus of claim 1 wherein the remote server aggregates orders from a plurality of remote servers.

14. The apparatus of claim 1 wherein the sensors are sonic or ultrasonic pulse-echo sensors.

15. The apparatus of claim 1 wherein the sensors are metal detection proximity sensors.

16. A method for ordering gas cylinders comprising:

placing gas cylinders in a cage having a plurality of parallel bins with defined gas cylinder storage locations forming an x-y pattern of storage cells;

arranging the gas cylinders in the cage so that only one type of gas cylinder is in each bin;

storing an electrical signal representing a desired number of gas cylinders of each gas type to be placed in the cage;

storing an electrical signal representing a threshold number of gas cylinders of each gas type that is less than the desired number for ordering replacement cylinders upon reaching the threshold number;

periodically sensing the presence or absence of gas cylinders in the storage cells using cylinder proximity detectors and generating a count signal for gas cylinders of each gas type;

generating an order signal when a count signal for gas cylinders of a gas type reaches the threshold number, the order signal representing a number of gas cylinders of the particular gas type between the desired number of gas cylinders and the threshold number; and providing a cloud server receiving the order signals, the cloud server having software for order delivery.

17. The method of claim 16 wherein said periodic sensing is by transmitting an optical beam in a direction spanning a storage cell wherein blockage of the beam generates a signal indicating presence of a gas cylinder and reception of the beam generates a signal indicating absence of a gas cylinder in the storage cell.

18. The method of claim 16 wherein said periodic sensing is by sonic pulse-echo sensors.

19. The method of claim 16 wherein the order signal is augmented by a signal representing a number of gas cylinders for gas cylinders other than the cylinders of the particular type whose threshold count is reached, with the augmentation number signal being a signal for the desired number of cylinders for each gas type other than said particular type less the corresponding count signal for said each gas type, wherein an order signal represents a count of all desired numbers of gas cylinders of the cage who presence is not sensed.

* * * * *